Patented July 31, 1923.

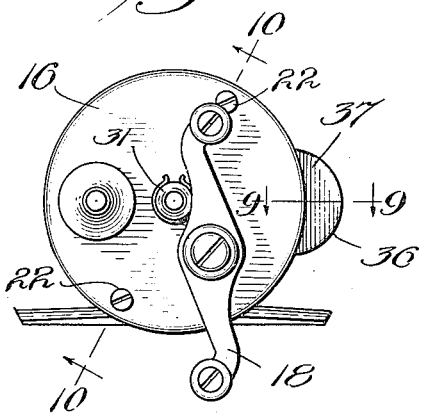
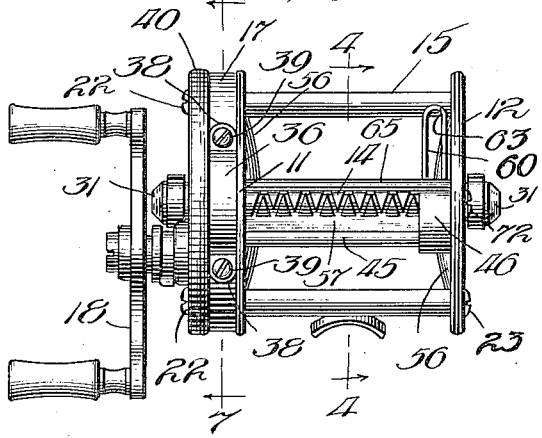
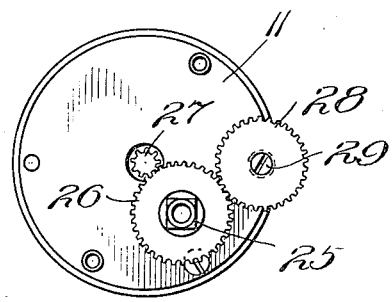
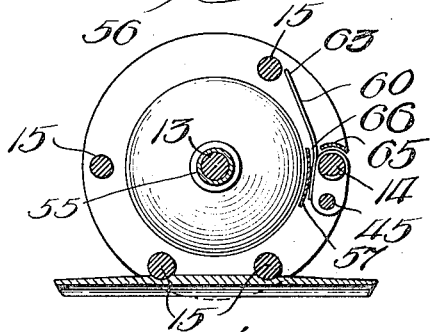
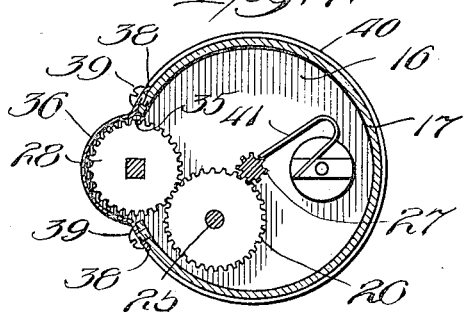

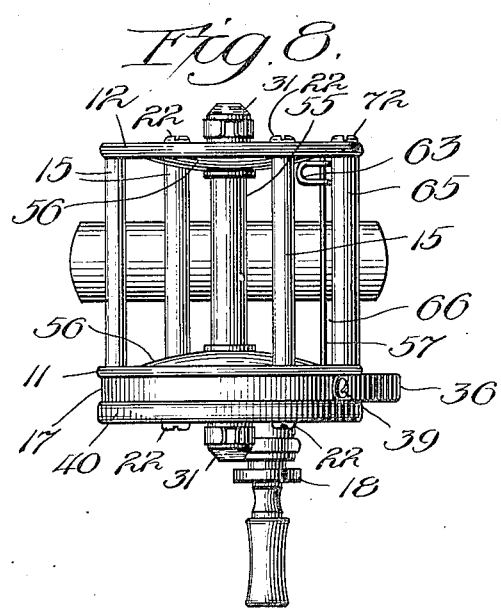
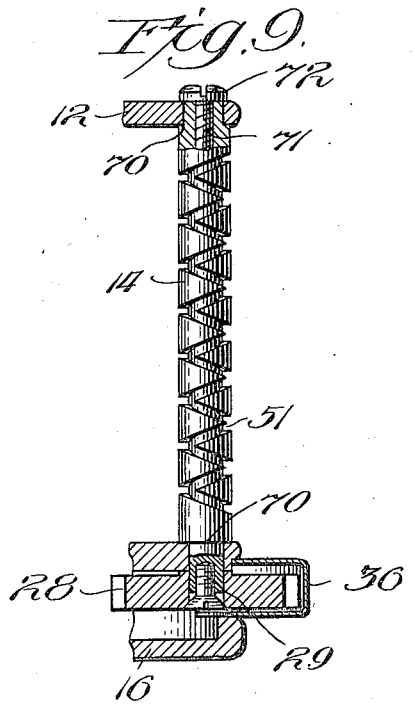
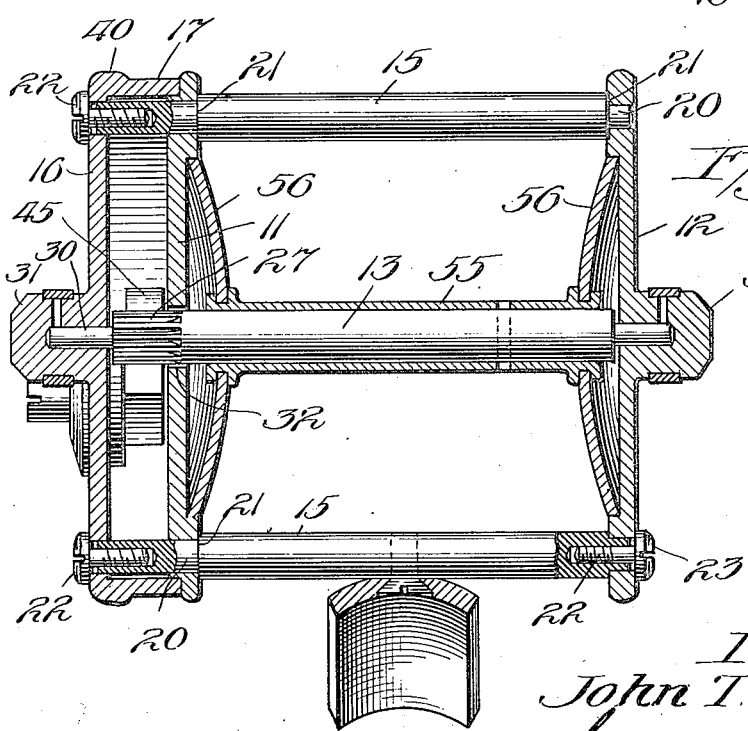

1,463,642

UNITED STATES PATENT OFFICE.

JOHN T. WELCH, OF DOWAGIAC, MICHIGAN, ASSIGNOR TO JAMES HEDDON'S SONS, OF DOWAGIAC, MICHIGAN, A CORPORATION OF MICHIGAN.

FISHING REEL.

Application filed October 8, 1921. Serial No. 506,333.

*To all whom it may concern:*

Be it known that I, JOHN T. WELCH, a citizen of the United States, residing at Dowagiac, in the county of Cass and State of Michigan, have invented certain new and useful Improvements in Fishing Reels, of which the following is a specification.

This invention relates to a fishing reel with which is combined a level winding mechanism, and is concerned with certain improved features of construction by which the parts are protected against undue wear and liability to disorder.

An exemplification of this invention is shown in the acompanying drawings, in the manner following:

Figure 1 is an end elevation of the fishing reel;

Fig. 2 is the side elevation thereof;

Fig. 3 is a view similar to Fig. 1, except that the end cap is removed;

Fig. 4 is a transverse section therethrough taken on line 4—4 of Fig. 2;

Fig. 5 is an enlarged detail in front elevation of the line guide carriage;

Fig. 6 is a transverse section therethrough taken on line 6—6 of Fig. 5;

Fig. 7 is a transverse section through the reel taken on line 7—7 of Fig. 2;

Fig. 8 is a plan view of the reel;

Fig. 9 is an enlarged sectional view taken on line 9—9 of Fig. 1; and

Fig. 10 is an enlarged longitudinal section through the reel, taken on line 10—10 of Fig. 1.

The principal parts of my reel include a pair of spaced head plates 11 and 12, between which are spool and traversing shafts 13 and 14, respectively, as well as the usual pillars 15. Associated with one head plate is a cap 16 having flanged walls 17 so as to provide a chamber within which may be arranged driving connections that are set in motion through the medium of a crank 18.

Referring now to Figs. 10, the two pillars therein shown are each reduced at their end portions as at 20 to provide shoulders 21 which may abut against the inner faces of the two end plates to space them apart a desired distance. A threaded socket may be formed in each end of these pillars, into which is entered a screw 22 whose head 23 is adapted to bear against the outer face of the head plate 12, in the one instance, and against the outer face of the cap 16, in the other instance. By means such as these, the pillars are secured fixedly in place, and by the same means also the cap is removably mounted upon its associated head plate.

Within the cap is formed a bearing for a crank shaft 25 which carries on its inner end a pinion 26 arranged to mesh with two other pinions 27 and 28, the latter being made fast to the traversing shaft 14 as through the medium of a screw 29. The pinion 27 is formed on the spool shaft 13 whose opposite ends 30 are of reduced diameter, being journaled in bearings 31, one formed in the end wall of the cap 16 and the other on the head plate 12.

A desirable gear ratio may be obtained by having the crank pinion 26 of slightly greater diameter than the traversing shaft pinion 28, and of considerably greater diameter than the spool pinion 27, all as indicated in Fig. 3. In such an arrangement, however, the pinion 28 may be required to protrude through a slot 35 which is formed in the flanged walls of the cap so as to lie partly to the exterior thereof. To cover this protruding portion of the traversing shaft pinion I have devised a housing in the form of an arc-shaped cap 36 having spaced parallel walls 37 that lie adjacent the opposite sides of the pinion 28, ears 38 being extended from opposite ends of the housing to lie upon the flanged walls of the cap, as shown. By means of screws 39, or other equivalent devices, which are entered through the ears 38 into the walls of the cap, the housing is securely mounted in place. It will be noted that the flanged walls of the cap are of slightly less diameter than the head plate 11, and that an annular shoulder 40 is formed adjacent the cap end, this construction providing in effect two beads which extend cicumferentially of the cap walls. It is between these two beads that the housing 36 is secured in place upon the cap.

A click device 41 is mounted upon the inner face of the cap in position to engage with the spool pinion 27 when the cap is assembled in place. When the cap is removed from the reel, the crank shaft, as well as the crank pinion, remain assembled therewithin, as these parts are unitary in relation. The traversing shaft pinion 28 is thereupon exposed and may be detached by removing the screw 29. It is preferred that this pinion be formed with a square axial hole to fit non-rotatably upon the end of the traversing shaft which is squared in a complementary manner. By forming the parts in this way, the reel elements may be disassembled readily whenever occasion may require.

Extending between the two head plates in proximity to the traversing shaft is a steady bar 45 on which a carriage 46 is mounted for reciprocation. This carriage is provided with a longitudinal opening 47 through which the traversing shaft also extends, the steady bar passing through a second opening 48 in the carriage. Between these two openings is arranged a pawl 49 whose body may be rested upon the steady bar, the toothed end 50 of the pawl being engaged with one of the threads 51 of the traversing shaft. With rotation of the crank shaft, and the consequent turning of the traversing shaft, the pawl is actuated by its threads to travel lengthwise of the reel, first in one direction and then reverse itself to travel back again, each of these reciprocations necessitating a like movement of the carriage.

Upon the spool shaft is mounted a core 55 to receive the line windings, end flanges 56 being carried thereby and partially recessed within the head plates in the manner that is common to fishing reels. Extending between the two end plates and adjacent to the periphery of the flanges 56 is a shield 57 having by preference a transverse curvature about corresponding to that of the spool flanges at their periphery. The carriage is mounted to travel very close to this shield, as appears in Fig. 4. Mounted on the carriage is a line guide 60 in the form of a looped wire whose ends 61 are secured to the carriage side which is adjacent to the shield 57. I have provided upon this same side of the carriage a recess, preferably in the form of a pair of grooves 62, each adapted to partially receive the ends of the line guide, as best shown in Fig. 6, for the double purpose of adding strength to the connection between the carriage and the line guide, and of accommodating the line guide upon the carriage in a space of reduced width. The free end of the line guide which is looped around as at 63 is disposed adjacent to one of the pillars 15, being relatively close to the spool on which the line is wound.

The shield just described is supplemented by a second shield 65 which overlies the carriage and which extends between the two head plates. This shield 65 is preferably arched in cross section, as shown, and presents one edge adjacent to the line guide. Since the two shields just described lie upon opposite sides of the line guide, and very close thereto, it follows that a slot 66 is formed therebetween through which the line guide travels in its movements longitudinally of the reel. The construction just described is thoroughly effective to prevent lodgment of water, grit or other deleterious substances upon the traversing shaft, such as tend to impair its working efficiency. In addition, the line guide is shown to be positioned relatively close to the spool so as to better guide the line windings thereon.

Each end of the traversing shaft is slightly reduced as best shown in Fig. 9, to provide shoulders 70 that may bear against the inner faces of the two head plates to thereby resist end thrusts. In the use of a level wind reel, the traversing shaft commonly vibrates, particularly at the end which is remote from its driving pinion, and from this cause, as well as from the end thrusts which occur with each reciprocation of the carriage, the bearing in the head plate 12 is apt to wear unduly. In order to compensate for any such wear from which results end play of the traversing shaft, I have arranged at its end which is journaled in the head plate 12 a screw 71 whose head 72 bears against the outer face of this plate. This screw head co-operates with the shoulders 70 to hold the traversing shaft against end play, and furthermore is readily removable, whenever occasion may require, so as to receive one or more shims (not shown) which may be interposed between the screw head and the head plate. In this manner adjustments may be made as necessary to keep the traversing shaft in a smoothly running condition. By preference this adjusting screw fits tightly in the shaft end so as to resist turning therein, and, if desired, its head may be formed without any slot so as to require the use of a special tool to effect its rotation.

A reel constructed according to the preceding description, if proper workmanship and materials be used, will run very quietly and freely. Its several parts may be produced and assembled at a reasonable expense, and in operation they will not tend to get out of order, or break down even though subjected to constant use. The wearing parts may be suitably reinforced to prolong the life of the reel, and adjustments thereof may be made, as required, to preserve the reel in fit condition for use.

I claim:

1. In a fishing reel, the combination of a spool shaft, a traversing shaft, driving connections therebetween, a carriage mounted for reciprocation on the traversing shaft, means for guiding the carriage with one side thereof facing the spool shaft, there being a pair of grooves in said carriage side, and a line guide mounted on the carriage and partially recessed within each groove and extending away from the carriage with its remote end free, substantially as described.

2. In a fishing reel, the combination of a spool shaft, a traversing shaft, driving connections therebetween, a carriage mounted for reciprocation on the traversing shaft, means for guiding the carriage with one side thereof facing the spool shaft, there being two parallel grooves formed on said carriage side, and a line guide in the form of a looped wire having its ends received within the groove and secured to the carriage, the looped end of the guide which extends away from the carriage being free, substantially as described.

3. In a fishing reel, the combination of a spool shaft, a traversing shaft, driving connections therebetween, a carriage mounted for reciprocation on the traversing shaft with one side of the carriage facing the spool shaft, there being a pair of grooves in said carriage side, a line guide mounted on the carriage and partially received within each groove, a shield for the carriage arranged in part between the carriage and the spool shaft, and means independent of the line guide for holding the carriage against rotary movements, substantially as described.

4. In a fishing reel, the combination of a traversing shaft, a spool shaft, a flanged spool mounted thereon, a driving connection between the spool and traversing shafts, a carriage mounted for reciprocation on the traversing shaft, means independent of the traversing shaft for preventing rocking of the carriage in the direction of its travel, and, in co-operation with the traversing shaft, for preventing rotation of the carriage, a shield arranged to present a portion of itself over the carriage and, separated therefrom, another portion between the carriage and the spool shaft, and a line guide mounted on the carriage to extend therefrom through the space which intervenes between the two portions of the shield, substantially as described.

5. In a fishing reel, the combination of a spool shaft, a traversing shaft, a driving connection between the shafts, a carriage mounted for reciprocation on the traversing shaft, there being a pair of grooves formed in the carriage walls, a line guide mounted on the carriage and arranged partly within each of the grooves therein, a shield disposed above and to the inside of the carriage having a longitudinal slit through which the line guide extends, and means independent of the line guide for guiding the carriage in its reciprocations, substantially as described.

JACK T. WELCH.

Witness:
EPHRAIM BANNING.